United States Patent [19]

George et al.

[11] 4,141,149
[45] Feb. 27, 1979

[54] PORTABLE COMPARATOR GAGE FOR MEASURING THE RELATIVE DEVIATION IN THE DIAMETER OF CYLINDERS

[75] Inventors: Harvey F. George, West Hempstead; Charles G. Marrara, Franklin Square; Robert H. Oppenheimer, Glen Cove, all of N.Y.

[73] Assignee: Gravure Research Institute, Inc., Port Washington, N.Y.

[21] Appl. No.: 728,196

[22] Filed: Sep. 30, 1976

[51] Int. Cl.$^2$ .................... G01B 7/12; G01B 7/28; G01B 7/34
[52] U.S. Cl. .................... 33/178 D; 33/125 T; 33/174 Q; 33/178 D; 33/174 P
[58] Field of Search ............ 33/178 D, 178 E, 178 R, 33/174 P, 174 Q, 174 L, 125 T

[56] References Cited

U.S. PATENT DOCUMENTS

| | | | |
|---|---|---|---|
| 1,401,119 | 12/1921 | Aldeborgh | 33/178 D |
| 2,303,007 | 11/1942 | Thomason | 33/178 D |
| 3,274,693 | 9/1966 | Witzke | 33/174 L |
| 3,321,869 | 5/1967 | Parrella et al. | 51/165.8 |
| 3,332,153 | 7/1967 | Loewen | 33/125 T |
| 3,368,395 | 2/1968 | Wright | 73/105 |
| 3,427,723 | 2/1969 | Leckey et al. | 33/174 R |
| 3,615,143 | 10/1971 | Barr et al. | 33/174 P |
| 3,648,377 | 3/1972 | Witzke | 33/174 R |
| 3,650,036 | 3/1972 | Covemey | 33/174 P |
| 3,780,442 | 12/1973 | Gresho | 33/178 E |
| 3,875,667 | 4/1975 | Wilke | 33/174 L |
| 3,921,300 | 11/1975 | Cox et al. | 33/125 T |

*Primary Examiner*—Richard E. Aegerter
*Assistant Examiner*—Willis Little
*Attorney, Agent, or Firm*—Bryan & Bollo

[57] ABSTRACT

A portable comparator gage for cylinders having a self-supporting configuration with a high stiffness to weight ratio to minimize the contact force and therefore "spring open" of the gage when it is placed on a cylinder, and temperature compensation means to compensate for inaccuracies in the measurements of the relative deviation of the diameter of the cylinder resulting from variations in the temperature of the cylinder and gage from a nominal temperature.

4 Claims, 4 Drawing Figures

PORTABLE COMPARATOR GAGE FOR MEASURING THE RELATIVE DEVIATION IN THE DIAMETER OF CYLINDERS

The present invention relates to comparator gages, and more particularly to a portable comparator gage for measuring the relative deviation in diameter of a cylinder for use in gravure printing.

In gravure printing, consistency and uniformity in the diameters of printing cylinders is required for proper printing performance. In particular, to ensure straight paper feed and to avoid introducing wrinkles and paper breaks, it is necessary that the cylinders be of true cylindrical shape and of substantially the same diameter along their length so that proper paper tension in maintained in the rotogravure press.

Various techniques and devices are known for measuring the diameter of gravure printing cylinders. One such technique for obtaining absolute cylinder diameter measurements uses a large micrometer which is handheld by the operator to contact the cylinder surface at points 180° apart. However, such a technique does not enable a ready determination of relative uniformity of the diameter of the cylinder along its length and the large micrometer is relatively cumbersome to employ.

Comparison gages eliminate some of the drawbacks associated with absolute measuring devices. Specifically, they can be utilized to determined quickly and accurately deviations of a particular cylinder from a standard.

Known comparison gages generally employ a V-block construction, with a movable plunger located at or below the apex of the V-block. See, for example, U.S. Pat. Nos. 1,401,119 (Aldeborgh); 3,274,693 (Witzke); 3,648,377 (Witzke); and 2,303,007 (Thomason). However, such known gages suffer from inaccuracy resulting from "spring open" when the gages are placed on the cylinder.

"Spring open" results as the legs of the gage frame deflect slightly, similarly to that of a clothes pin, when the gages are manually positioned on the cylinder. Therefore, the accuracy of the measurement of such gages is dependent upon how gently or abruptly the gage is positioned on the cylinder. Further, this spring open phenomenon may cause marring of the cylinder surface during manual placement of the gage on or removal from the surface of the cylinder.

It has been advantageously found in the present invention that the aforementioned spring open and cylinder marring problems may be eliminated by forming the gage frame of a light metal such as aluminum, titanium, or magnesium to provide a maximum stiffness to weight ratio to the gage frame, i.e., a minimum spring open force.

Moreover, in order to change copy, the gravure cylinders are stripped down, replated, and polished to size. Because of their large size, the gravure cylinders retain heat from the plating bath for a substantial period of time. Measurements of the cylinder diameter are thus often made while the gravure cylinder is above room temperature.

In the present invention, temperature compensation means are advantageously utilized to compensate for inaccuracies in the measurements of the relative deviation of the diameter of the cylinder resulting from variations in the temperature of the cylinder and the gage from a nominal temperature.

It is an object of the present invention to provide a portable comparator gage for accurately measuring the deviation of the diameter of a cylinder from a nominal diameter (reference cylinder).

It is a further object of the present invention to provide a portable comparator gage having a minimum contact force, i.e., a high stiffness to weight ratio.

It is a still further object of the present invention to provide a portable comparator gage which automatically compensates for any change in dimensions of the cylinder and the gage caused by deviations in their temperatures from a nominal temperature.

It is a still further object of the present invention to provide a portable comparator gage which is of relatively low cost and compact design.

Other objects, aspects and advantages of the present invention will be apparent from the description and accompanying drawings.

Briefly, the portable comparator gage of the present invention includes a rigid support frame shaped to be self-supporting when placed on a cylinder and having a high stiffness to weight ratio to minimize spring open of the support frame during placement on the cylinder, displacement means mounted in said rigid support frame including a depending moveable plunger, the displacement means providing an output signal proportional to the relative movement of the plunger when the rigid support frame is placed on the cylinder, temperature compensation means for providing output signals due to a change in dimensions of the cylinder and gage caused by differences in temperature of the cylinder and rigid support frame as compared with a nominal temperature, and circuit means for receiving the output signals from the displacement means and temperature compensation means for providing a signal proportional to the deviation in diameter of the cylinder from a nominal diameter.

The preferred embodiment of the present invention is illustrated in the drawings. However, the present invention should not be construed to be limited solely to the preferred embodiment.

Figure 1:
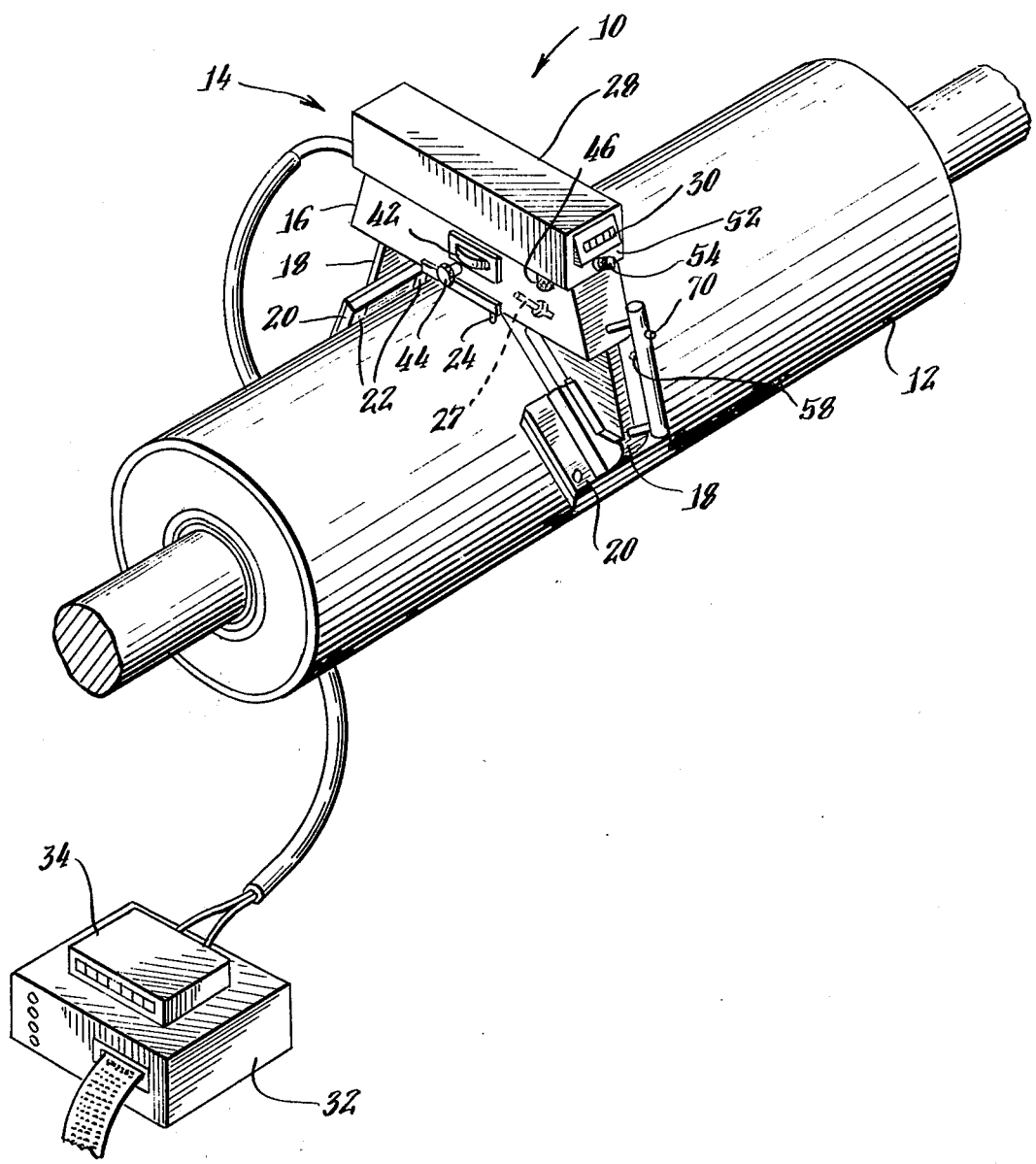
FIG. 1 is a perspective view of a portable comparator gage in accordance with the present invention positioned on a gravure printing cylinder and electrically coupled to a conventional recording device.

Referring to FIG. 1, the portable comparator gage of the present invention is generally illustrated at 10, positioned on a gravure printing cylinder 12. The portable comparator gage 10 includes a rigid frame 14 having a body portion 16 and a pair of depending support legs 18. Preferably, the support legs 18 are integrally formed with the body portion 16 and extend downwardly at a slight outward angle therefrom to form a generally V-block configuration to facilitate seating on the cylinder 12. Affixed to each support leg 18 is a wide anodized planar support pad 20 which advantageously includes plastic strips 22 at each end to prevent marring or drinking of the surface of the cylinder 12 when the gage 10 is positioned thereon. The planar support pads 20 provide tangential contact with the surface of the cylinder 12.

The generally V-block configuration of the rigid frame 14 provides three point support to the gage 10 making it self-supporting when placed on the cylinder 12. Moreover, the wide pads 20 aid in maintaining the position of the gage 10 on the cylinder 12.

The rigid frame 14, including the body portion 16 and support legs 18, is formed of a light weight metal such as aluminum, which will provide a stiffness of about three times that of a steel frame of the same weight having reduced but similar cross-sectional proportions. Preferably, the light weight metal used is aluminum, although titanium and magnesium and other light weight metals, having a favorable stiffness to weight ratio, may also be used as desired. A high stiffness to weight ratio provides a minimum contact force when the rigid frame 14 is placed on the cylinder, thereby minimizing spring open of the legs 18 and preventing variations in deviation measurements due to this spring open phenomenon. It has been found that a gage 10 constructed according to the present invention and used in measuring a publication cylinder, typically having a diameter of approximately 14 inches, should have a stiffness to weight ratio above 50,000 to provide minimal deflection.

Figure 2:
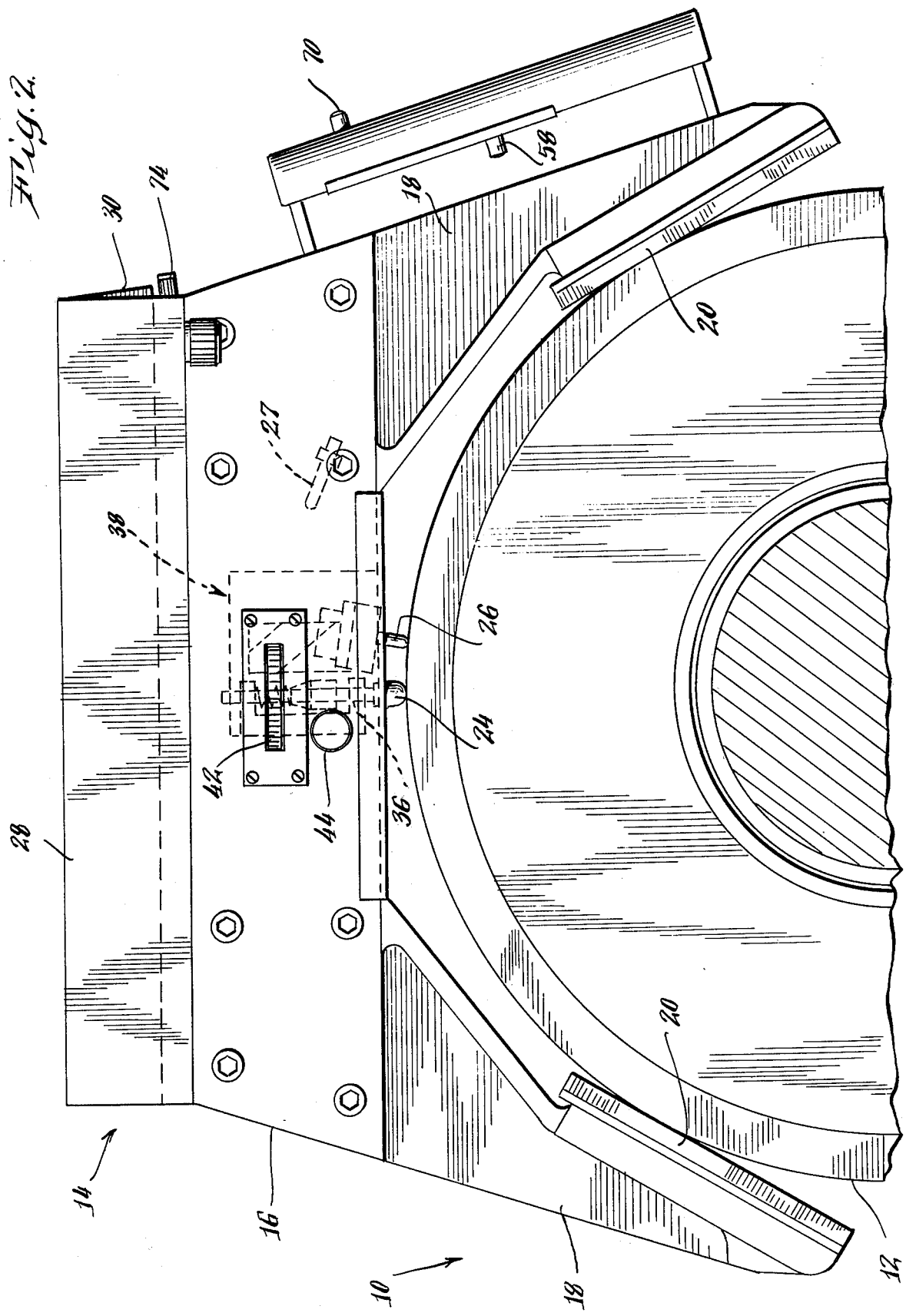
FIG. 2 is an enlarged side elevational view of the portable comparator gage of FIG. 1.

The comparator gage 10 includes a sensor in the form of a depending movable plunger 24 positioned along the longitudinal axis determined by the center of the cylinder 12 under test and the virtual apex of the included angle formed by the intersection of tangent lines through the planar surfaces of the support pads 20, which are normal to the radii of the cylinder 12 at the line of contact, see FIG. 2. The plunger 24 extends downwardly from the body portion 16 of the rigid frame 14 and moves upwardly and downwardly along its longitudinal axis from a nominal position upon contact with or for contact with the surface of the cylinder 12 when the gage 10 is positioned on the cylinder 12.

A first thermistor probe 26 also extends from the body portion 16 of the rigid frame 14 for normal contact with the surface of the cylinder 12. A second thermistor probe 27, is mounted within the body portion 16 of the rigid frame 14 to contact the inner surface of the rigid frame 14.

Advantageously, a console 28 is affixed to the body portion 16 of the rigid frame 14. The console 28 houses the electronic circuitry including a digital panel meter 30 and the energy sources, preferably rechargeable batteries. Output signals from the console 28 are advantageously applied to a conventional digital printer 32, which is preset with a conventional thumbwheel multi-station switch assembly 34.

Referring to FIG. 2, the portable comparator gage 10 is shown enlarged. The plunger 24 is coupled to the core 36 of a conventional linear variable displacement transducer (LVDT) 38, such as LVDT Model 350-000, available commercially from Trans-Tek Corporation. As is well known in the art the LVDT 38 provides a difference output voltage which corresponds to the relative movement of its core 36.

Positioned behind the plunger 24 and slightly offset relative thereto is the first thermistor probe 26, such as Model K1841, available from Fenwal Corporation. The first thermistor probe 26 contacts the cylinder 12 normal to its surface and provides an output signal corresponding to the temperature of the cylinder 12. Mounted in the body portion 16 of the rigid frame 14 is the second identical thermistor probe 27 which is in contact with the innerwall of the rigid frame 14 to provide an output signal corresponding to the temperature of the rigid frame 14.

As perhaps most apparent from FIG. 2, considering the gage apex to be the point of intersection of intersecting lines extending from the planar support pads 20 and the distance between the center of the cylinder 12 and the apex to represent one side of an isosceles triangle, it is clear that this distance is twice as long as the distance from the center of the cylinder 12 to the point where the pads 20 contact the surface of the cylinder 12, which equals the radius of the cylinder 12. Thus, the position of the plunger 24 will normally correspond to the radius of a standard or reference cylinder. The distance the plunger 24 moves on the test cylinder 12 represents the deviation or difference between the radius of the test cylinder 12 and the reference cylinder.

Zeroing of the LVDT 38 can be accomplished mechanically via a zero adjust disc 42 which is mechanically coupled to the body of the LVDT 38 for adjusting the position of the body of the LVDT 38 relative to the core 36. The body of the LVDT 38 can be locked into position by a zero lock 44. An additional zeroing capability is provided electrically by means of a zero knob 46 coupled to the shaft of a zero adjust potentiometer 116 and associated electronic zeroing circuitry located in the console 28.

Figure 3:
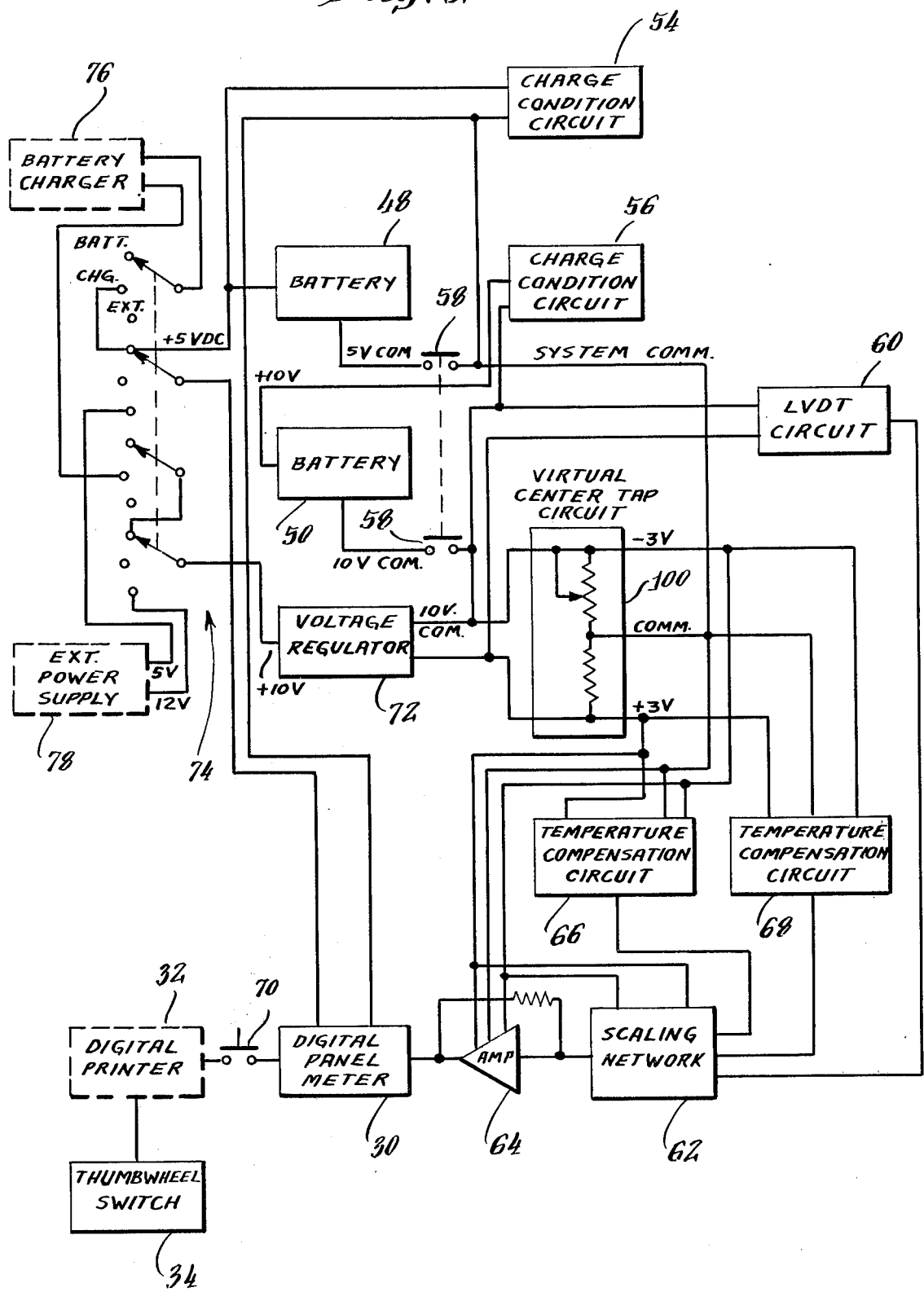
FIG. 3 is a block diagram of the components of the portable comparator gage.

Referring to FIG. 3, the system components of the comparator gage 10 are illustrated. The energy source for the comparator gage 10 includes a 5 volt rechargeable battery 48 and a 10 volt rechargeable battery 50. While the gage 10 is operative and the batteries 48 and 50 are at an acceptable charge level, light-emitting diodes 52, see FIG. 4, in charge condition circuits 54 and 56 remain illuminated. Snap-action switch 58 conveniently located on the handle 59 of the gage 10 permits the batteries 48 and 50 to be disconnected unless the snap-action switch 58 is held depressed. When the snap-action switch 58 is closed, the battery 50 supplies 10 volt DC energy to the voltage regulator 72 which in turn provides a well-regulated voltage to the LVDT circuit 60, the temperature compensation and virtual center tap circuits and the amplifier and scaling network. With closure of the snap-action switch 58, the battery 48 supplies 5 volt DC energy to the digital panel meter 30.

Movement of the pluner 24, and therefore, the core 36 of the LVDT 38, results in an output signal from the LVDT circuit 60 which corresponds to the displacement of the plunger 24 from its null, or zero signal position. This null or zero position corresponds to the displacement of the LDVT core 36 with respect to the radius of the reference cylinder. Therefore, movement of the plunger 24 therefrom represents the radius (diameter) deviation of the test cylinder 12 with respect to the reference cylinder.

The output of the LVDT 38 is fed from the LVDT circuit 60 to a scaling network 62 and then transmitted to an operational amplifier 64. The output of amplifier 64 is fed to the digital panel meter 30.

A first temperature compensation circuit 66, which includes the thermistor probe 26, provides an output signal to the scaling network 62 and therefrom to the operational amplifier 64. A second temperature compensation circuit 68, which includes the thermistor probe 27, provides another output signal to the scaling network 62 and therefrom to the operational amplifier 64. The signals from the temperature compensation circuits 66 and 68 compensate for changes in dimension of the cylinder 12 and rigid frame 14, respectively, due to variations in temperature thereof from a nominal temperature, e.g., room temperature.

Preferably, the digital panel meter 30 employed is a 5 volt D.C., 3 ½ digit Newport Model 253-01 which can provide readouts of ±0.0199 or ±0.1999 or ±19.99 to an accuracy of ±0.05% of the reading (or ± 1 count). A digital printer unit 32, which may be used with the gage 10 as desired, is selected to be compatible with the binary coded decimal output of the panel meter 30 and its polarity bit. One such digital printer unit 32 is Newport Model 810.

Input to the digital printer unit 32 is provided by the 11 station thumbwheel switch assembly 34, such as EECO Model A 101318 (EECO 1976 series), as well as from the digital panel meter 30. The digital printer 32 takes BCD data from the 11 station thumbwheel switch assembly 34 and from the digital panel meter 30 of the gage 10 and prints out information on paper tape. Switch 70 conveniently located on the handle 59 of the gage 10 activates the printer unit 32, and permits transmission of information thereto from the digital panel meter 30.

Each temperature compensation circuit 66 and 68 uses the same virtual common, the junction of $R_{10}$ and $R_{11}$. The temperature compensation signal is derived from the unbalance condition of each half bridge circuit, illustrated more fully in FIG. 4. In calibrating the two temperature compensation circuits 66 and 68 it is desired that they be balanced to produce a null output at room temperature, i.e., 77° F.

The voltage regulator 72 maintains a constant voltage input to the half bridges of the temperature compensation circuits 66 and 68 and to the LVDT circuit 60.

Each thermistor probe 26 and 27 has a resistance variation with temperature rise of $$\Delta R_T / \Delta T = -286 \text{ ohm}/° \text{C.} = \delta R_T / \delta T$$

$$R_T = 10K \text{ at } 25° \text{C.}$$

The voltage excitation ($E_B$) to each half bridge circuit which includes a thermistor probe and the balancing portion of a potentiometer (nominally 10K ohms) is 125 MV. Thus, $$V_o = \frac{R_T}{R_T + 10K} E_B$$

Therefore, $$\frac{\delta V_o}{\delta T} = \frac{10K \frac{\delta R_T}{\delta T} E_B}{(R_T + 10K)^2} \approx \frac{-286 E_B}{40K}$$

Thus, the signal voltage change with temperature is ± 0.9MV/° C.

For a change in the diameter measurement due to changes in dimensions of the body portion 16 of the rigid frame 14 and the cylinder 12 caused by thermal expansion:

$$h = r(\csc \theta - 1) - t_1 \cos a.$$

The LVDT measurement of diameter deviation is
$\Delta h = \Delta r (\csc \theta - 1) - r \csc \theta \cot \theta \Delta \theta - \Delta t_1 \cos + t_1 \sin \theta \Delta \theta$
For $\theta = 30°$, $\csc \theta = 2$, $\cos \theta = 0.866$. Therefore, $$\Delta h = \Delta r - 0.866 \Delta t_1$$

Due to thermal expansion, for a steel cylinder 12 and an aluminum rigid body 14

$$\Delta h = R \alpha_s \Delta T - 0.8666 \, t_1 \, \alpha \, al \, \Delta T$$

Therefore,
$$\delta h / \delta T = R \alpha_s - 0.866 \, t_{1\alpha} al$$

Where $\alpha$ steel $= 11 \times 10^{31\,6}$ $\alpha al = 23 \times 10^{31\,6}$ For a cylinder 12 having a radius of 7 inches $t_1 = 5$ inchesk for the support legs 18.

$$\frac{\delta h}{\delta T} = .077 \text{ mils}/° \text{ C} - 0.1 \text{ mils}/° \text{ C}$$
$$\quad\quad\text{(cylinder)} \quad\quad \text{(support legs)}$$

Since each temperature bridge delivers ±0.9MV/° C. output, the scaling network 62 reduces these outputs to the desired values to compensate for the erroneous $\Delta r$ measured by the LVDT 38.

Figure 4:
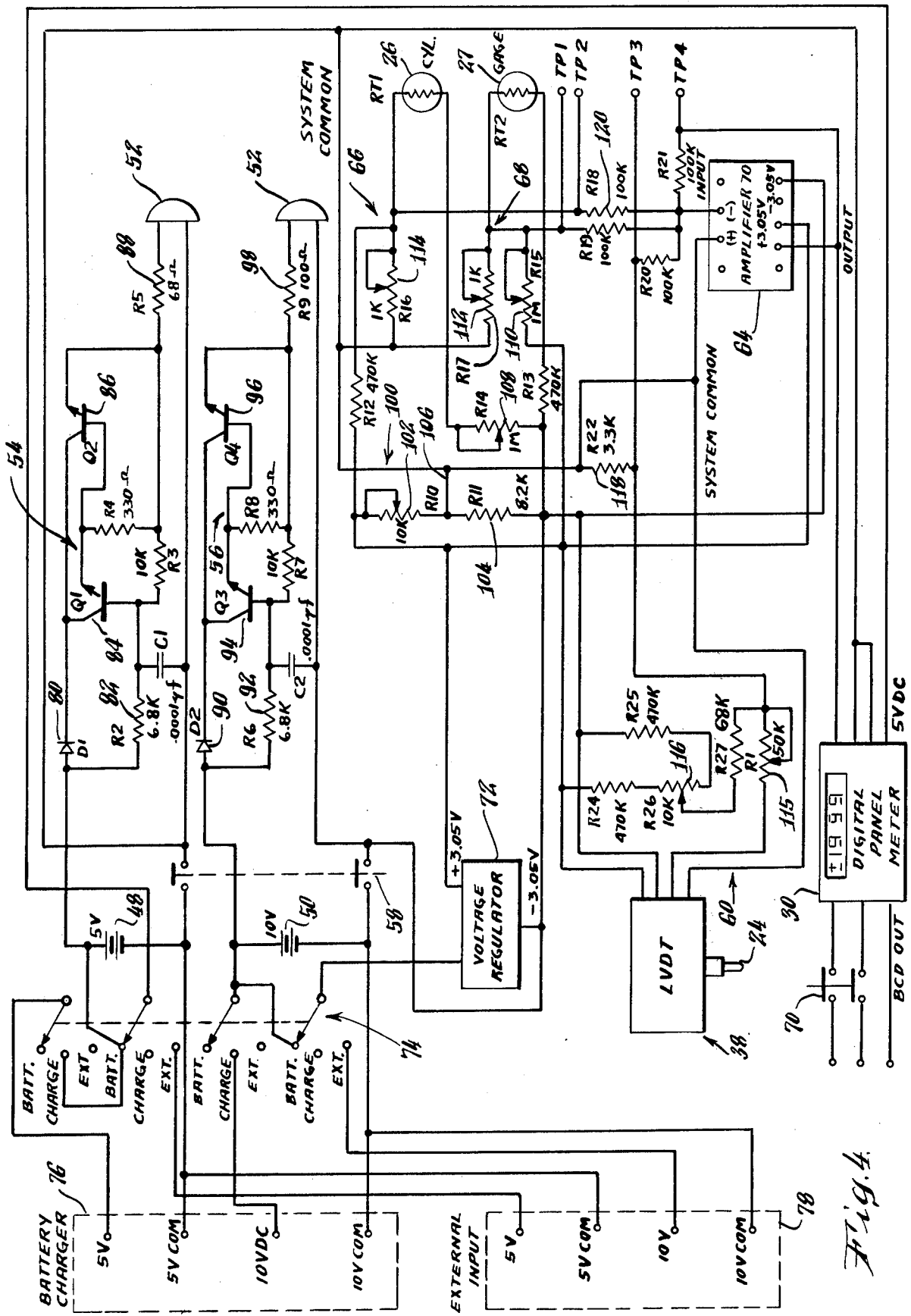
FIG. 4 is a detailed schematic diagram of the electric circuit for the portable comparator gage.

Referring to FIG. 4, the electronic circuit for the comparator gage 10 is illustrated. A 4 pole, 3 position rotary switch 74 located in the console 28, see also FIG. 1, is set to enable the gage 10 to be powered by batteries 48 and 50, an external power source, or enable the batteries 48 and 50 to be recharged. For the latter purpose a conventional battery charger 76 may be utilized. The batteries 48 and 50 or the external power supply 78, depending on the position of rotary switch 74, energize the comparator gage 10 when snap-action switch 58 is depressed and held in a depressed position. The 5 V battery 48 powers the digital panel meter 30 and the 10 V battery powers the remaining circuitry of the comparatory gage 10.

Battery charge condition circuits 54 and 56, see also FIG. 3, monitor the voltage levels of batteries 48 and 50 and provide a visual indication as to whether the batteries have an acceptable charge conditions, e.g., over 4 volts for battery 48, and over 8 volts for battery 50. When either or both light emitting diodes 52 are extinguished, the batteries 48 and 50 must be recharged.

Battery charge condition circuit 54 includes a diode 80 for providing a reference level to the LED circuit (88 and 52). A biasing resistor 82 applies a bias voltage to the base of NPN transistor 84. The output from the emitter of the transistor 84 is applied to the base of another NPN transistor 86; the transistors 84 and 86 are arranged in a common collector configuration. The output from the NPN transistor 86 is applied to a load resistor 88 in series with the LED 52. If the voltage of the battery is above a predetermined threshold, e.g., 4 volts, the transistor 86 will supply sufficient current to the load resistor 88 to maintain the LED 52 energized (lighted).

Similarly, battery charge condition circuit 56 includes a reference diode 90 and a biasing resistor 92 for applying a bias voltage to the base of NPN transistor 94. The output from the emitter of the transistor 94 is applied to the base of NPN transistor 96; the transistors 94 and 96 are arranged in a common collector configuration. The output of the NPN transistor 96 is supplied to a load resistor 98 in series with the LED 50. If the voltage of the battery 50 is above a predetermined threshold, e.g., 8 volts, the emitter of the transistor 96 will provide sufficient current to the load resistor 98 to maintain the LED energized (lighted).

Since the LVDT circuit 60, the temperature compensation circuits 66 and 68, electronic zeroing circuit 116, and amplifier circuit 64 are sensitive to battery voltage fluctuations, the voltage regulator 72 is employed to produce a constant 6.1 volts D.C. regulated output, although the output of battery 50 may vary between 8 and 12 volts D.C. The output of the voltage regulator 72 is fed to a virtual center tap circuit 100 including resistors 102 and 104, $R_{10}$ and $R_{11}$, respectively. By connecting the virtual center tap 106 to the 5 VDC system common, the low side of the regulator output becomes −3.05 VDC and the high side becomes +3.05 VDC. The center-tap is provided by adjustment of resistor 102, permitting the two outputs to be matched (±3.05 VDC) with respect to system common.

The temperature compensation circuits 66 and 68 including thermistor probes 26 and 27, $R_{T1}$ and $R_{T2}$, are respectively arranged in a half-bridge configuration. The total excitation voltage to the bridge is approximately 125 MVDC. Potentiometers 108 and 110 are adjusted to produce null outputs from each half-bridge at room temperature. Trim potentiometers 112 and 114 provide the necessary scaling network 62 to reduce the ±0.9MV/° C. output from each half-bridge to the desired values.

The LVDT 38 provides an output voltage directly proportional to the displacement of the movable core 36 from its null position. Adjustment of potentiometer 116 will produce the proper null reading on the digital panel meter 30.

Amplifier 64 sums the electrical displacement signals generated by LVDT circuit 60 and the temperature compensation signals generated by temperature compensation circuits 66 and 68 and provides an input signal to the digital panel meter 30. Preferably, amplifier 64 is a Model 1006 FET operational amplifier, available from Teledyne Corporation.

In operating the gage 10, a 5° C. rise in the temperature of the cylinder 12 will cause the radius of a typical copper clad steel cylinder used in gravure printing to increase by 0.000385 inches. This increase in radius will cause an equal relative displacement of the LVDT plunger 24. Since the LVDT 38 used here has a 25 volts/inch sensitivity, the 5° C. rise in temperature will cause a change in the voltage signal generated by the LVDT 38. Therefore, the temperature compensation circuit 66 will deliver a voltage signal to the operational amplifier 64 which balances out the additional voltage generated by the LVDT 38 due to expansion of the cylinder 12.

To calibrate the thermistor 26 to produce such a temperature compenstation signal, the junction (TP3) of potentiometer 115 and resistor 118, and the junction (TP2) of resistor 120 and potentiometer 114 are connected to system common. With switch 58 engaged, potentiometer 108 is then adjusted until a null is obtained on the digital panel meter 30 at room temperature. To adjust the scaling or calibration for this half-bridge circuit, the temperature of the gage 10 is raised to 30° C. (86° F.), and then to 35° C. (95° F.). If these readings are not obtained, potentiometer 114 is adjusted to yield the proper result. Thus, in this way the half-bridge circuit for the thermistor 26 is adjusted to generate a temperature compensation signal of −0.077 MV for each degree centigrade rise in temperature of the cylinder to be tested.

Similarly, a 5° C. rise in temperature will cause the aluminum rigid body 14 to expand and raise the body of the LVDT 0.0005 inches further away from the surface of the cylinder 12; in effect, the LVDT plunger 24 will be moved 0.0005 inches further down from the LVDT body 22. This relative displacement will generate a −0.5 MV change in the voltage signal from the LVDT 38. Therefore, a +0.5 MV voltage must be fed from the temperature compensation circuit 68 to the operational amplifier 64. In order to calibrate thermistor 27 to produce the desired temperature compensation voltage signal, a similar procedure to that described above is followed. First, the junction (TP3) of poentiometer 115 and resistor 118, and the junction (TP1) of resistor 121 and potentiometer 112, are connected to system common. With the snap-action switch 58 closed, potentiometer 110 is then adjusted until a null reading is obtained on the digital panel meter 30 at room temperature. To adjust the scaling or calibration of this half-bridge circuit, the temperature of the gage 10 is raised to 30° C. and 35° C. If the proper readings are not obtained, potentiometer 112 is adjusted to yield the proper result. Thus, in this way, the half-bridge circuit for the thermistor 27 is adjusted to generate a temperature compensation signal of +0.1 MV for each degree centigrade rise in the temperature of the cylinder to be tested.

With the temperature compensation circuits 66 and 68 properly zeroed and calibrated, the fully scaled composite input to the digital panel meter 30 will indicate the temperature-compensated diameter change of the cylinder 12 under test.

Nominal zero adjustment of the gage 10 is accomplished by placing the gage 10 upon a reference or master cylinder with the spring-loaded LVDT plunger 24 in contact with the surface of the cylinder 12. With the snap-action switch 58 depresssed, an electrical displacement signal is generated by the LVDT circuit 60 which is directly proportional to the displacement of the plunger 24 from its null position relative to the stationary body of the LVDT 38. Nominal zero adjustment of the gage 10 is obtained by releasing the zero lock 44 and rotating the zero adjust disc 42, see FIGS. 1 and 2, to move the stationary body of the LVDT 38 until a zero reading is recorded on the digital panel meter 30. The LVDT body is then locked in position by engaging the zero lock 44.

Should the range of the mechanical zeroing be slightly exceeded without obtaining a zero reading on the digital panel meter 30, the electronic zero knob 46, see FIGS. 1 and 2, is utilized. This electronic zero knob 46 adjusts potentiometer 116, allowing a small DC bias to be fed to the operational amplifier 64 in order to zero the reading on the digital panel meter 30.

To measure the cylinder diameter deviation, after the gage 10 has been calibrated and zeroed with reference cylinder, comparator gage 10 is placed on the cylinder 12 whose diameter is to be checked. The rotary switch 74 is adjusted to external or battery position and the snap-action switch 58 is despressed and held. The relative displacement of the plunger 24 from its reference position will generate an electrical displacement signal proportional to the deviation of the radius of the cylinder 12. Simultaneously, the temperature compensation circuit 66 will generate a first temperature compensation signal proportional to the difference in temperature between the surface of the test cylinder 12 and a nominal temperature. The temperature compensation circuit 68 generates a second temperature compensation signal proportional to the difference between the temperature of the rigid body 14 and a nominal temperature. These three signals are then combined in amplifier 64 and transmitted to the digital panel meter 30 to produce a signal directly proportional to the relative deviation in the diameter of the test cylinder 12 in the area under test. This procedure may then be repeated at different points along the length of the cylinder 12, as desired, to determine the relative deviation in the diameter of the cylinder 12 along its entire length. It should be understood that the invention described herein has particular application to copper clad printing cylinders employed in gravure printing. However, it should be understood by those skilled in the art that various modifications may be made in the present invention without departing from the spirit and scope thereof, as described in the specification and defined in the appended claims.

What is claimed is:

1. A portable comparator gage for measuring the deviation in diameter of a gravure printing cylinder having a copper surface in which the pattern of cells in intaglio is to be formed, comprising:
   a single rigid v-shaped support frame having planar support surfaces for tangential contact with the surface of the gravure printing cylinder so that said rigid support frame is self-supporting when placed on a gravure printing cylinder, said rigid support frame being light in weight and having a stiffness to weight ratio above 50,000 to minimize spring open of the v-shaped support frame and prevent marring of the copper layer when placed on the gravure printing cylinder;
   displacement means mounted in said rigid support frame including a depending movable plunger, said movable plunger being positioned along the longitudinal axis determined by the center of the gravure printing cylinder and the virtual apex of the included angle formed by the intersection of tangent lines through said planar support surfaces, said displacement means providing an output signal proportional to the relative movement of said plunger when said rigid support frame is placed on the gravure printing cylinder;
   temperature compensation means for providing output signals for balancing out the errors in the displacement output signals due to a change in dimensions of the gravure printing cylinder and the gage caused by any differences in the temperature of the gravure printing cylinder and said rigid support frame as compared with a nominal temperature;
   said temperature compensation means includes a first temperature compensation circuit and a second temperature compensation circuit each arranged in a half-bridge configuration, each of said temperature compensation circuits including a thermistor;
   said thermistor of said first compensation circuit being arranged to contact the copper surface of the gravure printing cylinder, said thermistor of said second compensation circuit being arranged to contact said rigid support frame;
   said first compensation circuit providing an output signal proportional to the change in dimensions of the gravure printing cylinder caused by temperature differential relative to the nominal temperature, said second compensation circuit providing an output signal proportional to the change in dimensions of the rigid support frame caused by a differential temperature relative to the nominal temperature; and
   circuit means for receiving the output signals from said displacement means and said temperature compensation means for providing a signal proportional to the deviation in the diameter of the cylinder from a nominal diameter.

2. The portable comparison gage recited in claim 1, wherein:
   said rigid support frame is constructed of a metal selected from the group consisting of aluminum, titanium, and magnesium;
   said rigid v-shaped support frame has an included angle of about 60° at the virtual apex of the v.

3. The portable comparator gage recited in claim 1, wherein:
   said planar support surfaces include anodized support pads attached to said rigid support frame, said support pads having a width greater than the width of said rigid support frame at the points of attachment to said rigid support frame to aid in providing self-support to the gage when placed on the gravure printing cylinder.

4. A method for measuring the deviation of the diameter of a gravure printing cylinder from a nominal cylinder diameter, comprising the steps of:
   (a) providing a displacement signal proportional to the relative movement of a sensor from its reference position in a rigid frame when the rigid frame is placed on the cylinder;
   (b) generating a first temperature compensation signal proportional to a change in dimensions of the cylinder whose deviation is being measured caused by a temperature differential relative to a nominal temperature;
   (c) generating a second temperature compensation signal proportional to a change in dimensions of the rigid frame caused by a temperature differential relative to a nominal temperature;
   (d) summing the displacement signal and temperature compensation signals to provide an output signal proportional to the deviation of the diameter of the cylinder being measured from a nominal cylinder diameter; and
   (e) repeating steps (a) through (d) at different locations along the length of the gravure printing cylinder to determine the relative deviation in the diameter of the cylinder along its entire length.

* * * * *

UNITED STATES PATENT OFFICE
CERTIFICATE OF CORRECTION

Patent No. 4,141,149  Dated February 27, 1979

Inventor(s) Harvey F. George, Charles G. Marrara, Robert H. Oppenheimer

It is certified that error appears in the above-identified patent and that said Letters Patent are hereby corrected as shown below:

Column 1, line 29, "determined" should read --determine--.
Column 2, line 65, "drinking" should read --dinking--.
Column 4, line 46, "pluner" should read --plunger--.
Column 6, line 9, "11 x 10$^{31\ 6"}$ should read --11 x 10$^{-6}$--;
  line 11, "23 x 10$^{31\ 6"}$ should read --23 x 10$^{-6}$--;
  line 13, "inchesk" should read --inches--;
  line 40, after "have" delete "an".
Column 10, line 5, after "by" insert --a--;
  line 16, delete the period "." after "diameter" and insert a semicolon --;-- and insert:
--voltage regulator means for maintaining a constant D.C. output voltage; and
  virtual center tap circuit means electrically coupling said voltage regulator means to said half-bridge temperature compensation circuits for providing the same virtual common and matched voltage outputs to each of said half-bridge temperature compensation circuits.--

Signed and Sealed this

Fourteenth Day of August 1979

[SEAL]

Attest:

LUTRELLE F. PARKER
Attesting Officer   Acting Commissioner of Patents and Trademarks